UNITED STATES PATENT OFFICE.

WILLIAM W. CARTER, OF NEEDHAM, MASSACHUSETTS.

RUBBER SUBSTITUTE AND PROCESS OF MAKING THE SAME.

1,251,862.   Specification of Letters Patent.   Patented Jan. 1, 1918.

No Drawing.   Application filed March 29, 1917. Serial No. 158,403.

*To all whom it may concern:*

Be it known that I, WILLIAM W. CARTER, a citizen of the United States, residing at Needham, in the county of Norfolk and State of Massachusetts, have invented a new and useful Rubber Substitute and Process of Making the Same, of which the following is a specification.

This invention has for its object the production of a composition having such qualities that it can be used for many purposes as a substitute for india rubber, and includes the process hereinafter described and the product resulting from that process.

A composition made in accordance with my invention has as its basis the product resulting from the reaction of a sulfonate on an oil which can be polymerized by the action of sulfuric acid. There are many sulfonates which will produce the reaction, including those derived from benzol and naphthalene, from the higher homologues of these, and from the hydroxyl compounds based on the above groups, (phenols, naphthols, cresols, etc.), as well as others not so readily obtainable in commercial quantities. Mixtures of such sulfonates may also be used, and in practising my invention commercially I prefer to employ sulfonates derived from the so-called acids of coal tar or wood tar, or both. The manner in which tar acids can be obtained from wood tar and coal tar is well known, and the process of transforming such tar acids into sulfonates is also well known, so that in describing my process I will start with the steps taken after the sulfonates of the tar acids have been obtained.

The oil which I prefer to employ is China wood oil, in which case about two and one-half parts (by weight) of the oil and about two parts of the mixed sulfonates are required, the latter being of about the consistency of molasses. These ingredients are mixed with constant stirring and allowed to stand about half an hour, and during this period a reaction takes place which results in the production of a soft rubberlike material which will set and take the form of the receptacle if left to itself. For most purposes, however, further treatment is necessary for the reason that after the main reaction has taken place the mixture contains a certain amount of uncombined sulfonates and may also contain some free sulfuric acid, in case crude or impure sulfonates were employed, and these ingredients will cause the composition to gradually deteriorate if it comes in contact with water. The removal of the uncombined sulfonates and the sulfuric acid, if any, may be effected by washing the mixture before the resulting composition has set, but since such washing removes the free sulfonates and thereby arrests the reaction, the washed product will not solidify completely but will remain of a consistency resembling that of dough and will have a sticky nature. In this form when dried it can be dissolved in a solvent of the ring-group series, such as benzol, for example, thereby producing a thick, sticky cement which can be used for various purposes as a substitute for cement made of soft rubber. It may be noted, also, that the reaction product above referred to may be utilized for certain purposes without washing or other treatment in case it is to be kept out of contact with water. For example, it may be used as a filler for automobile tires by injecting it while soft into the inner tube of the tire and allowing it to set there. In such a situation, or in any situation where it cannot come in contact with water, the resulting composition will be stable and will have physical characteristics closely resembling those of soft india rubber.

To enable the composition to be employed more generally, it may be stabilized by treatment with a neutralizing agent, and since this agent is unable to act effectively after the composition has set it is added to the oil before the latter is mixed with the sulfonates and is prevented from acting until after the main reaction has taken place by previously providing it with a protective coating, as hereinafter explained.

The neutralizing agent may be any alkali which does not form water when combined with an acid, examples of such being borax, and silicates and phosphates which decompose and unite with sulfuric acid. Another example is red oxid of iron, which will give the resulting product a reddish tinge. Various substances adapted to serve as fillers as well as neutralizing agents may also be employed, such as rosin soap of aluminum, which will leave a rosin filler in the composition. If it is desired to give the composition a porous formation, like a sponge, this may be done by employing a neutralizing agent which gives off a gas when combined with an acid, but otherwise the neutralizing agent selected should be such that no gas will be given off. The amount of neutralizing agent employed in any case is to be calculated according to the proportion of free sulfonates and sulfuric acid found in the mixture after the main reaction has been completed. This may be determined by testing a sample, the amount being somewhat variable.

In order to prevent the neutralizing agent from acting prematurely it is covered with a protective coating of some substance which will be penetrated by the free acid and sulfonates after a sufficient interval has elapsed to allow the main reaction to be completed, and is more readily acted upon by the sulfonates and acid than is the rubberlike composition itself. The substance which I prefer to use for the protective coating is viscose solution, which is applied by reducing the neutralizing agent to granular form and then stirring it into the viscose solution until its particles are thoroughly coated, whereupon it is dried and ground and is then ready for use. Instead of viscose solution, various gummy substances dissolved in something other than water may be employed, examples of such being dammar, Pontianak and other natural gums and mixtures of these. Cellulose nitrate dissolved in amyl acetate, or a fusible gummy substance such as rosin, may also be used for the coating. After the neutralizing agent has been coated as above described it is stirred into the China wood oil and the sulfonate liquid is added thereto, and after the main reaction has been completed the protective coating which surrounds the particles of neutralizing agent is penetrated by the free sulfonates and the sulfuric acid, if any, which are thereupon neutralized within the rubberlike composition.

The neutralized product obtained in the manner above described is a stable, elastic and self-molding substance which acts very much like soft india rubber and can be cut by the same solvents, and softened by heat. It may be employed for a wide variety of purposes as a substitute for soft rubber, being useful, for example, in making rubber mats, floor tiles and the like. Any filler which can be used as such for india rubber can be used as well for my composition, provided it contains no free alkali and no water, although a less proportion of filler can be used to advantage with my composition than with soft rubber. The filler employed, if any, is preferably added to the oil before the main reaction takes place, and the treatment of the composition so far as forming it into various articles and giving it any desired shape is concerned is the same as in the case of soft india rubber. As examples of suitable fillers, dry sawdust, plaster of Paris, pigments, wool waste and cotton waste may be mentioned.

Instead of China wood oil any other oil which can be polymerized by the action of sulfuric acid, or mixtures of such oils, may be used in making my composition, although the consistency and tenacity of the resulting product may vary slightly, depending upon the oil employed.

I claim:

1. A process of producing a composition adapted for use as a rubber substitute, which includes the thorough mixing of a sulfonate and a polymerizable oil and allowing the mixture to stand until their reaction product has been formed, substantially as described.

2. A process of producing a composition adapted for use as a rubber substitute, which includes the thorough mixing of a sulfonate and a polymerizable oil and the elimination of any uncombined sulfonate and free acid remaining in the mixture after the reaction product has been formed, substantially as described.

3. A process of producing a composition adapted for use as a rubber substitute, which includes the thorough mixing of a sulfonate and a polymerizable oil and the neutralization of any uncombined sulfonate and free acid by means of a neutralizing agent which is prevented from acting until after the main reaction has taken place, substantially as described.

4. A process of producing a composition adapted for use as a rubber substitute, which includes the thorough mixing of a sulfonate and a polymerizable oil to which has been added a substance adapted to neutralize any free sulfonate and acid remaining in the mixture, said neutralizing substance being provided with a protective coating which is penetrated after the main reaction has taken place, substantially as described.

5. A process of producing a composition adapted for use as a rubber substitute, which includes the thorough mixing of a sulfonate and China wood oil, in about the proportions stated, and allowing the mixture to stand until the reaction product has been formed.

6. A process of producing a composition adapted for use as a rubber substitute which includes the thorough mixing in about the proportions stated, of China wood oil and sulfonates derived from tar acids and allowing the mixture to stand until the reaction product has been formed.

7. A process of producting a composition adapted for use as a rubber substitute, which includes the thorough mixing, in about the proportions stated, of sulfonates derived from the tar acids and China wood oil to which has been added a neutralizing agent having a protective coating which resists penetration by free sulfonates and acids in the mixture until after the main reaction has taken place.

8. A composition adapted for use as a rubber substitute, containing the reaction product of a polymerizable oil and a sulfonate.

9. A composition adapted for use as a rubber substitute, containing the reaction product of China wood oil and a sulfonate.

10. A composition adapted for use as a rubber substitute, containing the reaction product of China wood oil and sulfonates derived from tar acids.

11. A composition adapted for use as a rubber substitute, containing the reaction product of a polymerizable oil and a sulfonate and free from uncombined sulfonates and acids.

12. A composition adapted for use as a rubber substitute, containing the reaction product of a polymerizable oil and a sulfonate, together with a neutral compound derived from free sulfonates and a neutralizing agent.

Signed at Boston, Mass., this 17th day of March, 1917.

WILLIAM W. CARTER.

Copies of this patent may be obtained for five cents each, by addressing the "Commissioner of Patents, Washington, D. C."